(12) United States Patent
Kim (10) Patent No.: US 10,267,395 B2
(45) Date of Patent: Apr. 23, 2019

(54) ROTATIONAL ENERGY TRANSFER FROM LIQUID ENVIRONMENT TO GAS ENVIRONMENT WITHOUT THE LIQUID PENETRATION INTO GAS ENVIRONMENT

(71) Applicant: Chong Hun Kim, Fountain Valley, CA (US)

(72) Inventor: Chong Hun Kim, Fountain Valley, CA (US)

(73) Assignee: Chong H. Kim, Fountain Valley, CA (US)

( * ) Notice: Subject to any disclaimer, the term of this patent is extended or adjusted under 35 U.S.C. 154(b) by 156 days.

(21) Appl. No.: 15/067,026

(22) Filed: Mar. 10, 2016

(65) Prior Publication Data

US 2016/0273629 A1 Sep. 22, 2016

Related U.S. Application Data (60) Provisional application No. 62/135,104, filed on Mar. 18, 2015.

(51) Int. Cl.
*F16H 21/00* (2006.01)
*F16H 33/02* (2006.01)
*F16H 19/00* (2006.01)

(52) U.S. Cl.
CPC ........... *F16H 33/02* (2013.01); *F16H 19/001* (2013.01)

(58) Field of Classification Search
CPC ............................... F16H 33/02; F16H 19/001
See application file for complete search history.

(56) References Cited

U.S. PATENT DOCUMENTS

| | | | | |
|---|---|---|---|---|
| 2,521,759 A * | 9/1950 | Sorensen | ................ | F16H 33/02 464/59 |
| 2,619,193 A * | 11/1952 | Mangos | ................ | B66D 5/026 185/37 |
| 2,962,124 A * | 11/1960 | Lockett | .................... | B66D 5/00 185/31 |
| 3,164,526 A * | 1/1965 | Girard | ...................... | B66D 5/00 242/379.1 |
| 4,160,389 A * | 7/1979 | Kubono | ................... | E05B 81/25 192/103 B |
| 2012/0255385 A1* | 10/2012 | Nakayama | .............. | F16H 55/17 74/437 |
| 2014/0000397 A1* | 1/2014 | Nolta, Jr. | ................ | F16H 35/02 74/393 |
| 2017/0051539 A1* | 2/2017 | Handke | ................ | F16H 19/001 |

* cited by examiner

*Primary Examiner* — Jake Cook (57) ABSTRACT

A mechanism is introduced that allows transfer of mechanical rotational-energy generated in a liquid environment to a gas environment but does not allow the liquid to penetrate into the gas environment.

1 Claim, 12 Drawing Sheets

ROTATIONAL ENERGY TRANSFER FROM LIQUID ENVIRONMENT TO GAS ENVIRONMENT WITHOUT THE LIQUID PENETRATION INTO GAS ENVIRONMENT

CROSS-REFERENCE TO RELATED APPLICATION

U.S. Patent Documents

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATED-BY-REFERENCE OF MATERIAL SUBMITTED ON A COMPACT DISC OR AS A TEXT FILE VIA THE OFFICE ELECTRONIC FILING SYSTEM (EFS-WEB)

Application Ser. No. 15/067,026

STATEMENT REGARDING PRIOR DISCLOSURES BY THE INVENTOR OR A JOINT INVENTOR

Not Applicable

BACKGROUND OF THE INVENTION

(1) Field of Invention

The disclosure relates to transferring rotational energy from a liquid environment to a gas environment without allowing the liquid to flow from the liquid environment to the gas environment.

(2) Description of Related Art Including Information Disclosed Under 37 CFR 1.97 and 1.98

Not Applicable

BRIEF SUMMARY OF THE INVENTION

In the process of transferring rotational energy from a liquid environment to a gas environment without allowing the liquid to flow from the liquid environment to the gas environment, special sets of sprocket and lever configurations, and gravity are used. To prevent the liquid flow, non-corrosive chemical material is used.

BRIEF DESCRIPTION OF THE SEVERAL VIEWS OF THE DRAWING(S)

Brief Description of the Drawings

FIG. 1 Overall Configuration in Three Dimension
FIG. 2 Rotational System in a Liquid Environment
FIG. 3 Rotational System in a Gas Environment
FIG. 4 Liquid Blocking Shaft Configuration
FIG. 5 Beginning of the Levers and Sprockets Rotation Cycle
FIG. 6 Middle of the Levers and Sprockets Rotation Cycle
FIG. 7 Teeth Contact between the Output Lever and the Output Sprocket
FIG. 8 End of the Levers and Sprockets Contact Period
FIG. 9 Teeth Last Contact between the Output Lever and Output Sprocket in each Cycle
FIG. 10 No Contact between the Input Lever and the Input Sprocket
FIG. 11 Detail in Teeth Contact between the Output Lever and Output Sprocket (A)
FIG. 12 Detail in Teeth Contact between the Output Lever and Output Sprocket (B)
FIG. 13 Returning to the Beginning of the Lever Rotation Cycle

DETAIL DESCRIPTION OF THE INVENTION

Figure 1:
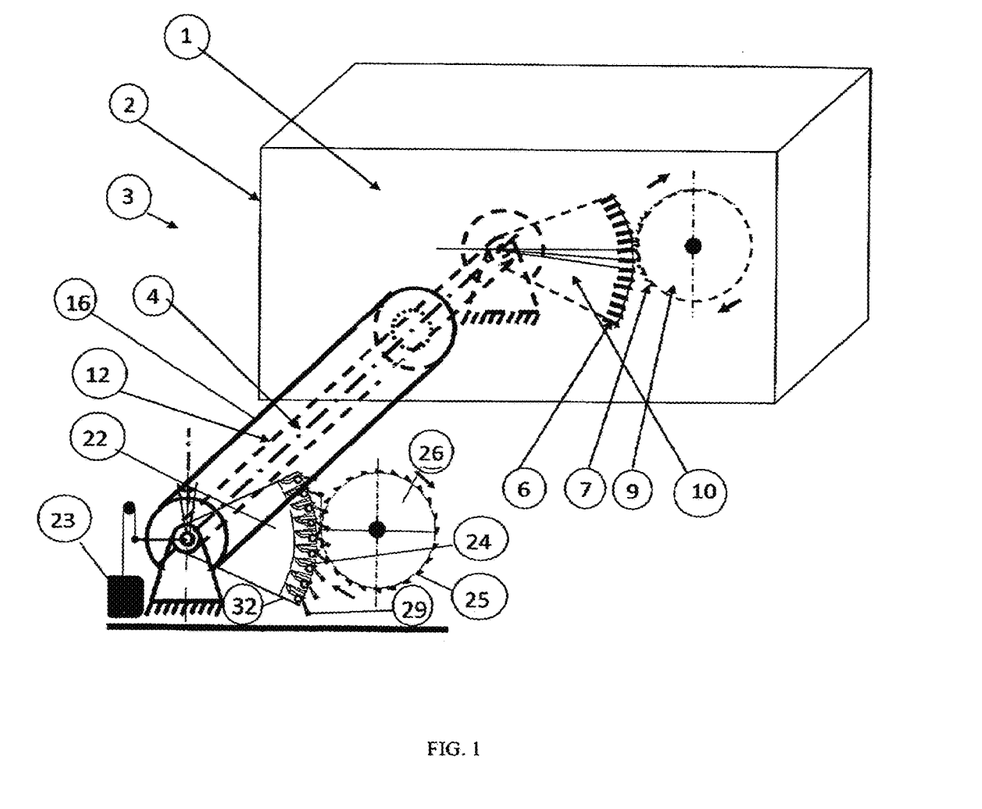
Figure 2:
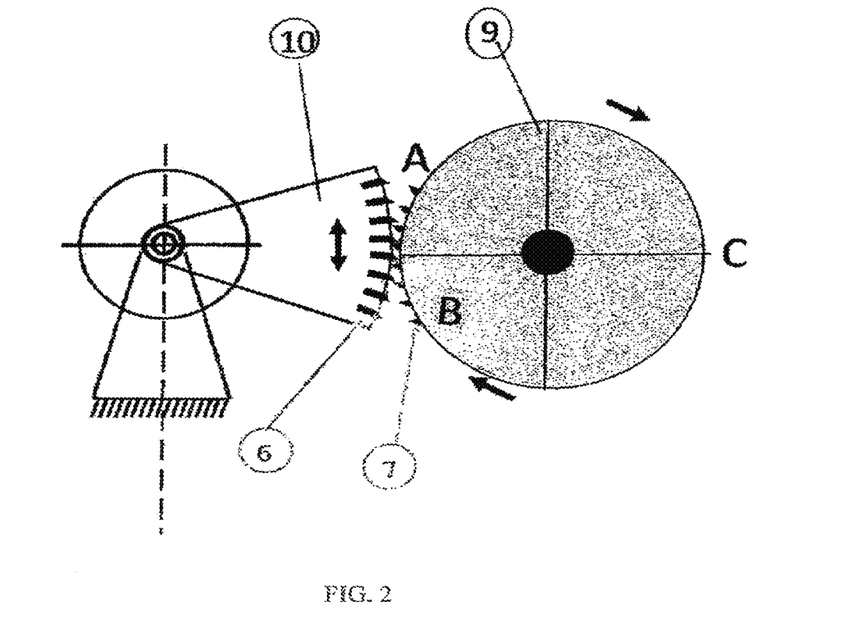

FIG. 1 shows a 3 dimensional configuration of an overall system that transfers rotational energy from a Liquid Environment (1) to a Gas Environment (3) via a Cylindrical Metal Shaft Container Assembly (16) without allowing the liquid to flow from the Liquid Environment (1) into the Gas Environment (3). The Wall (2) divides the Liquid Environment (1) and the Gas Environment (3). Names of the parts in the figure are:
- (1)—Liquid Environment
- (2)—Wall between a Liquid Environment and a Gas Environment
- (3)—Gas Environment
- (4)—Axial Center Line
- (6)—Input Lever Teeth
- (7)—Input Sprocket Teeth
- (9)—Input Sprocket
- (10)—Input Lever
- (12)—Metal Shaft
- (16)—Cylindrical Metal Shaft Container
- (22)—Output Lever
- (23)—Weight A
- (24)—Output Lever Teeth
- (25)—Output Sprocket Teeth
- (26)—Output Sprocket
- (32)—Tooth Housings
- (29)—Weight B in Each Tooth Housing FIG. 2 shows a side view of a rotational system in the liquid environment. As the Input Sprocket (9) rotates clockwise, the Teeth (7) of the input Sprocket (9) pushes up the Teeth (6) of input Lever (10) and rotates the Input Lever (10) in counter clockwise rotation. One important feature of the Input Sprocket (9) is that only a part of the Input Sprocket (9) circumference has teeth on it. Therefore, as it rotates clockwise, it does not contact the Input Lever (10) when the toothless portion of the Input Sprocket (9) faces the Input Lever (10)—disengagement period.

When it comes a portion of disengagement period, the Weight A (23) gravity force (see FIG. 1) pulls down the Weight A (23) and rotates the Output Lever (22) (see FIG. 1), Metal Shaft (12) (see FIG. 1), and the Input Lever (10) in clockwise rotation. This clockwise rotation is possible because there is no teeth in this portion of the Input Sprocket (9) and therefore there is no engagement between the Input Lever (10) and the Input Sprocket (9) during the disengagement period. Only the Weight A (23) gravity force (see FIG.

1) rotates the Output Lever (22) together with the Input Lever (10) (see FIG. 1) in clockwise rotation.

Thus, as the Input Sprocket (9) rotates in clockwise rotation alt the time, the Input Lever (10) rotates in clockwise or counter clockwise rotation alternatively. The unique teeth arrangement on the Input Sprocket (9) circumference and the gravity force of the Weight (23) explained above makes this operation possible.

Figure 3:
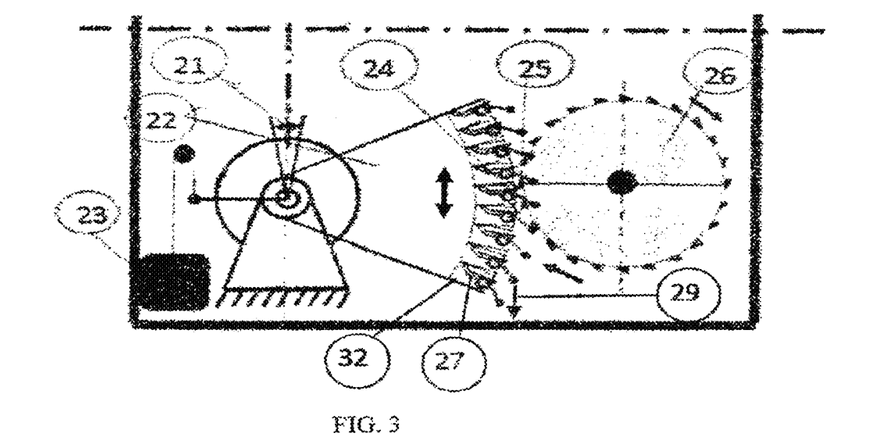

FIG. 3 shows a side view of a rotational system in a gas environment. As the Output Lever (22) rotates in clockwise or counter clockwise rotation alternatively along with the Input Lever (10), the Output Sprocket (26) rotates in clockwise rotation all the time without the rotational direction change, which is possible because the Tooth (24) on the Output Lever (22) engages with the Teeth (25) of the Output Sprocket (26) only when the Output Lever (22) rotates in counter clockwise rotation, but disengages when the Output Lever (22) rotates in clockwise rotation. FIG. 5 through FIG. 13 explain how the teeth engagement and disengagement take place. The Output Lever (22) and the Input Lever (10) rotate in the same direction. The amount of the rotation of the Output Lever (22) will be the same as the amount of the rotation of the Input Lever (10). As the Output Lever (22) rotates in counter clockwise rotation, the Tooth (24) of the Output Lever (22) pushes up the Tooth (25) of Output Sprocket (26) (detail of which is explained in FIG. 5 through FIG. 12) and forces the Output Sprocket (26) to rotate clockwise. The amount of the rotation of the Output Lever (22) is limited to the extent that there should be no damage on the Cylindrical Metal Shaft Container Assembly (16) (see FIG. 1), more specifically no damage on the Flexible Anti-Corrosive Chemical Rubber Cover (19) (see FIG. 4). The amount of the angle limitation will be fixed by the number of Teeth (7) on the Input Sprocket (9) (see FIG. 2).

Now, right after the last contact between the last Input Lever Tooth (6) (see FIG. 2) and the Input Sprocket tooth (7) (see FIG. 2), the toothless section of the Input Sprocket (9) (see FIG. 1 or 2) begins to face the Input Lever (10) (see FIG. 2) which is the beginning of the disengagement period and the gravity force of the Weight A (23) (see FIG. 1 or 3) pulls down the lever and rotates the Output Lever (22) and the Input Lever (10) clockwise.

As the Output Lever (22) rotates clockwise, the Output Lever Teeth (24) of the Output Lever (22) rotates counter clockwise and hides into the Tooth Housing (32) because the Teeth (25) of the Output Sprocket (26) causes the counter clock wise rotation of the Tooth Assembly (27) (FIG. 7), which ca uses the disengagement between the Output Lever (22) and Output Sprocket (26). Right after the disengagement, the Gravity Force of Weight B (29) in each Tooth Housing (32) rotates the Tooth Assembly (27) in the Tooth Housing (32) back in clockwise rotation and repositions the Tooth (24) back to the original position and be ready to push up the Tooth (25) of the Output Sprocket (26) in the next round of operation. Detail of this operation will be explained in FIG. 5 through FIG. 12.

Figure 4:
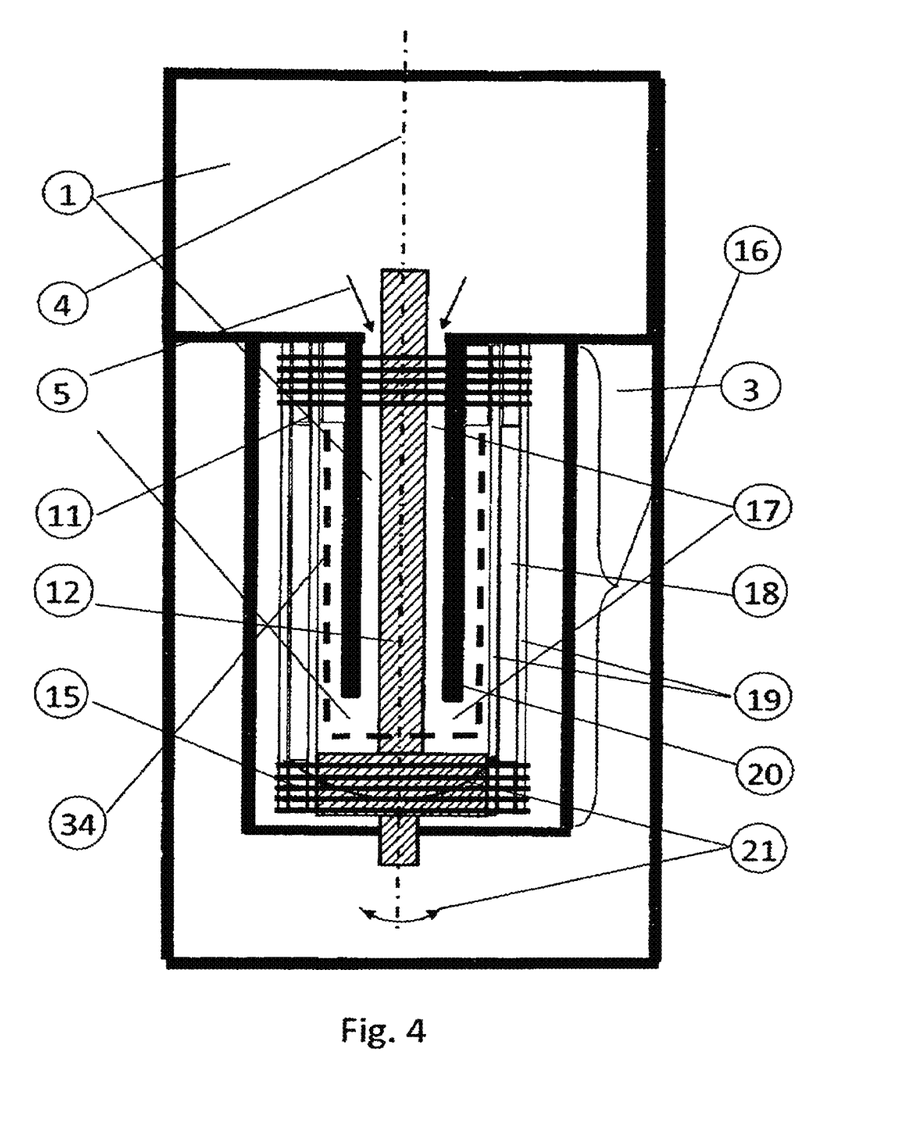

FIG. 4 shows a cross-section of the Cylindrical Metal Shaft Container (16) which transmits the rotational energy from the liquid environment to the gas environment and at same time blocks the liquid flow from the Liquid Environment (1) to the Gas Environment (3). As shown in the FIG. 4, there are Flexible Anti-Corrosive Chemical Rubber Covers (19) which is made of noncorrosive and stretchable material such as chemical rubber (REMA Tip Top Chemical 4A or 4B or RT). Oil (18) is inserted between the Chemical Rubber Covers of the Flexible Anti-Corrosive Chemical Rubber Cover (19) to minimize the rubbing resistance between the Covers of Flexible Anti-Corrosive Chemical Rubber Cover (19). The Top Part (11) of the Flexible Anti-Corrosive Chemical Rubber Cover (19) is tightly fastened to the outlet structure of the Liquid Environment Compartment (3). The Top Part (11) of the Flexible Anti-Corrosive Chemical Rubber Cover (19) does not rotate around the Axial Center Line (4) while the Bottom Part (15) of the Flexible Anti-Corrosive Chemical Rubber Cover (19) which is fastened to the Metal Shaft (12) rotates alternatively in clockwise rotation or counter clockwise rotation as the Metal Shaft (12) rotates alternatively in clockwise rotation or counter clockwise rotation. This configuration transmits the rotational energy and at the same time blocks the liquid flow from the Liquid Environment (1) to the Gas Environment (3). There is a Small Opening (5) between the Cylinder (20) and the Metal Shaft (12) and the liquid may penetrate through Small Opening (5) into the Gap Space (17). But the liquid is not allowed to enter into the Gas Environmental (3). That is, the Flexible Anti-Corrosive Chemical Rubber Cover (19) blocks the flow of the liquid into the Gas Environment (3). The Metal Shaft (12) rotates so many degrees (21) in clockwise rotation or counter clockwise rotation but less than the allowable amount of degrees such that no damage can occur on the Flexible Anti-Corrosive Chemical Rubber Cover (19).

Thus, the rotational energy can be transmitted from the Input Sprocket ((9) in FIG. 1) to the Output Sprocket ((26) in FIG. 1) without having the liquid transmit from the Liquid Environment (1) into the Gas Environment (3). The dotted line (34) is the boundary surface that blocks the ocean water flow from the ocean to the water-free compartment where the electricity generator is installed FIG. 5 through FIG. 12 in the following explain how the levers and sprockets systems work.

Figure 5:
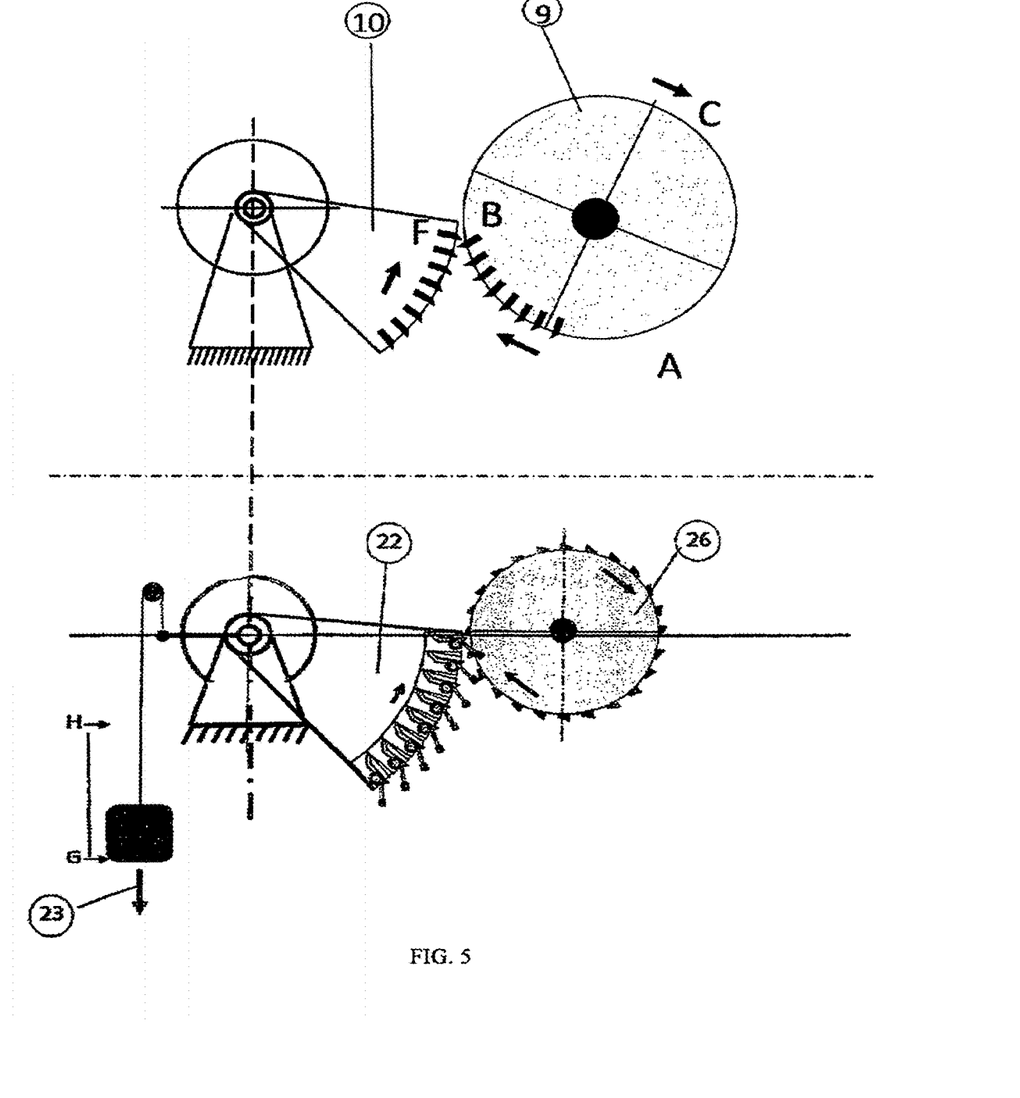

FIG. 5 shows the beginning of the rotation. The figure in the upper sections in FIG. 5 shows the lever and sprocket system in the Liquid Environment (1). The Input Sprocket (9) rotates in the direction as shown with two arrows. It should be noted that a large portion of the Input Sprocket (9) does not have Sprocket teeth. The reason for this arrangement is to allow a period of disengagement between the Input Sprocket (9) and the Input Lever (10). The contact of the Sprocket Tooth "B" of the Input Sprocket (9) with the Sprocket Tooth "F" of the Input Lever (10) is the beginning of the cycle. As the Input Sprocket (9) rotates clockwise, the Output Sprocket (26) also rotates clockwise (see FIG. 1). And the Weight (23) shown in the lower section will rise.

The figure in the lower section in FIG. 5 shows Output Lever (22) and Output Sprocket (26) placed in the Gas Environment (3).

Figure 6:
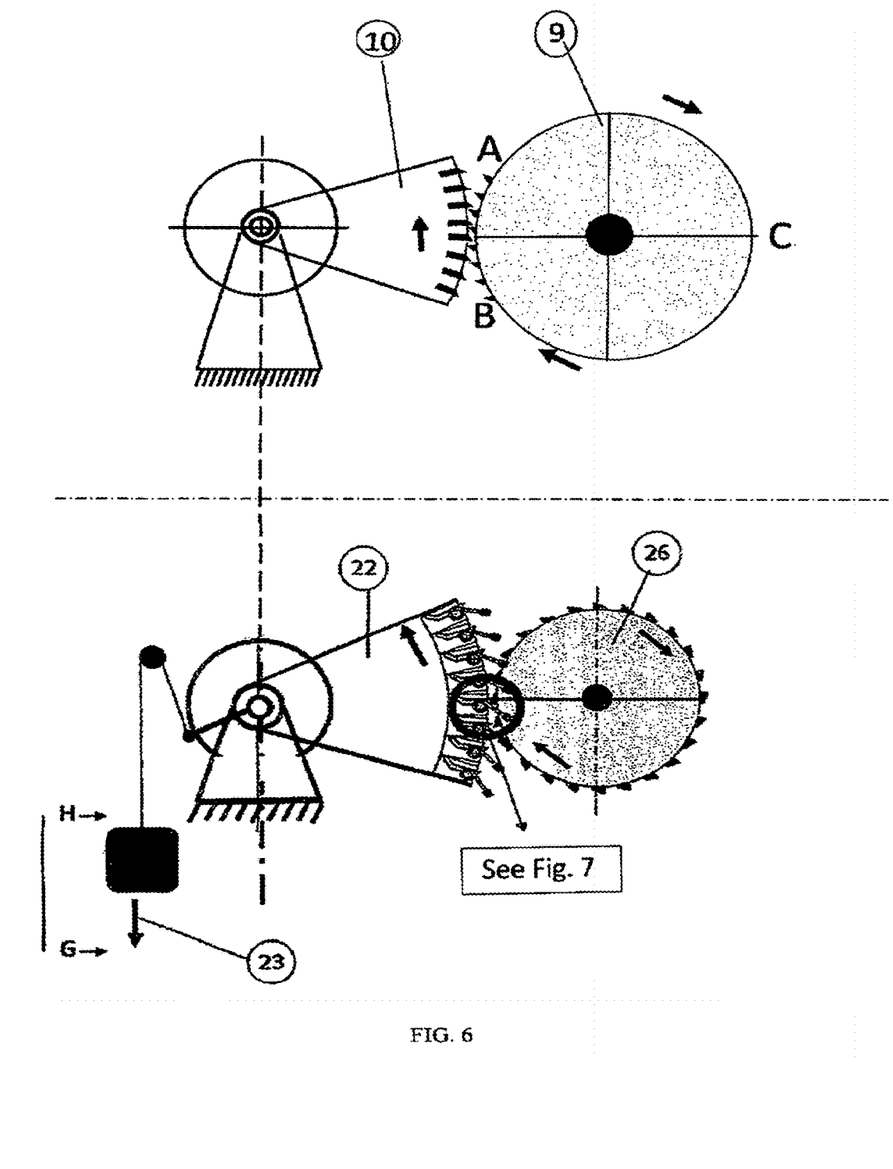

FIG. 6 shows a situation when the Input Lever (10) and the Output Lever (22) are rotated half way up. The circled area in the lower section of the figure will be explained in more detail in FIG. 7.

Figure 7:
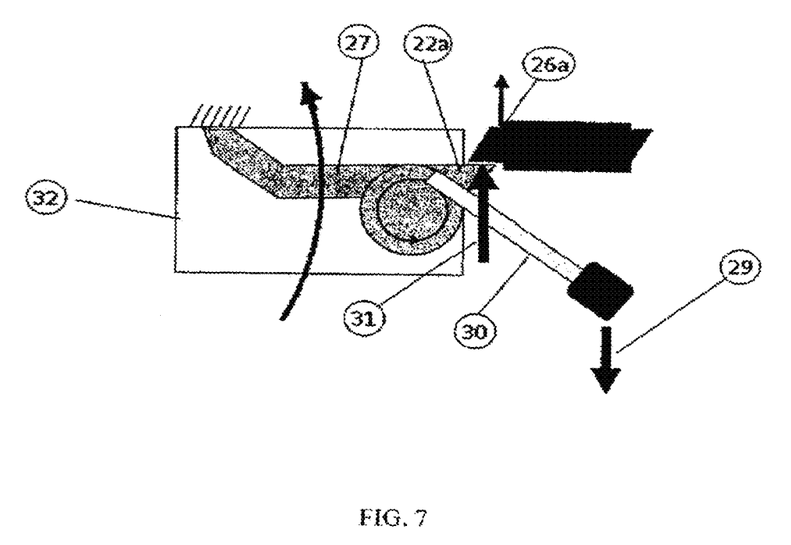

FIG. 7 shows a situation when an Output Lever Tooth (22a) pushes the Tooth (26a) of Output Sprocket (26) (see FIG. 6) up as the Tooth Assembly Box (32) moves up. Here, the Lifting Force (31) is greater than the gravity force of weight B (29). The Lifting Force (31) is coming from the Input Sprocket (9).

Figure 8:
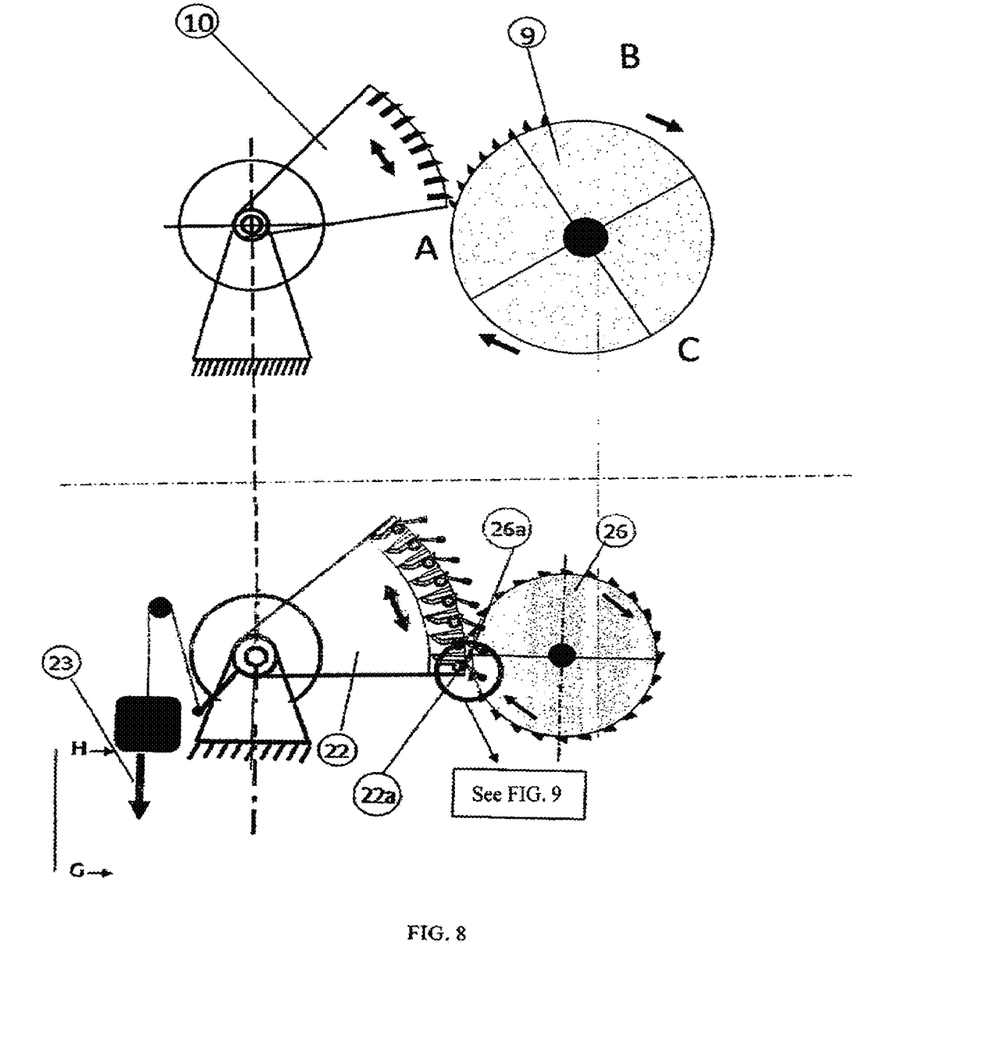

FIG. 8 shows a situation when the Input Lever (10) is just about to end the contact with the Input Sprocket (9). After this point on, there will be no contact between the Input Sprocket (9) and the Input Lever (10) because the section of no teeth on the Input Sprocket (9) circumference is starting. From this point on, the gravity force of the Weight A (23)

will be the only force present, which pulls down the Weight A (23) and rotates the Output Lever (22) and Input Lever (10) in clockwise rotation.
Note that the Metal Cylindrical Container (16) connecting the Input Lever (10) and the Output Lever (22) is not shown for clarity in explanation.

Figure 9:
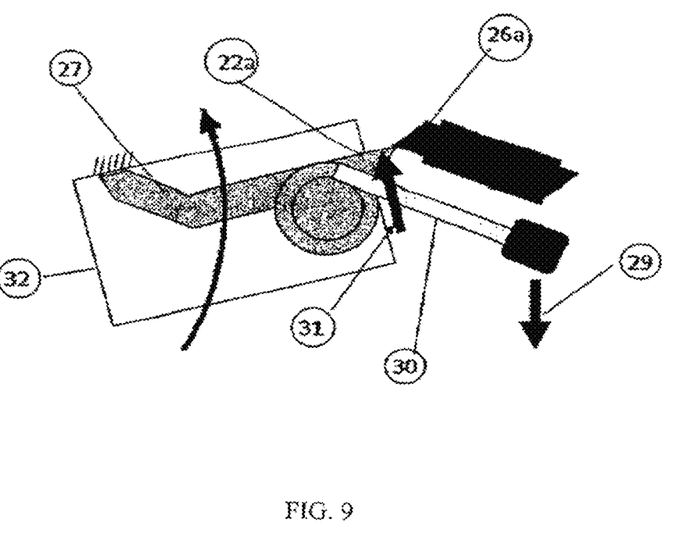

FIG. 9 depicts the ending part of the contact between the Output Lever Tooth (22a) and the Output Sprocket Tooth (26a).

Figure 10:
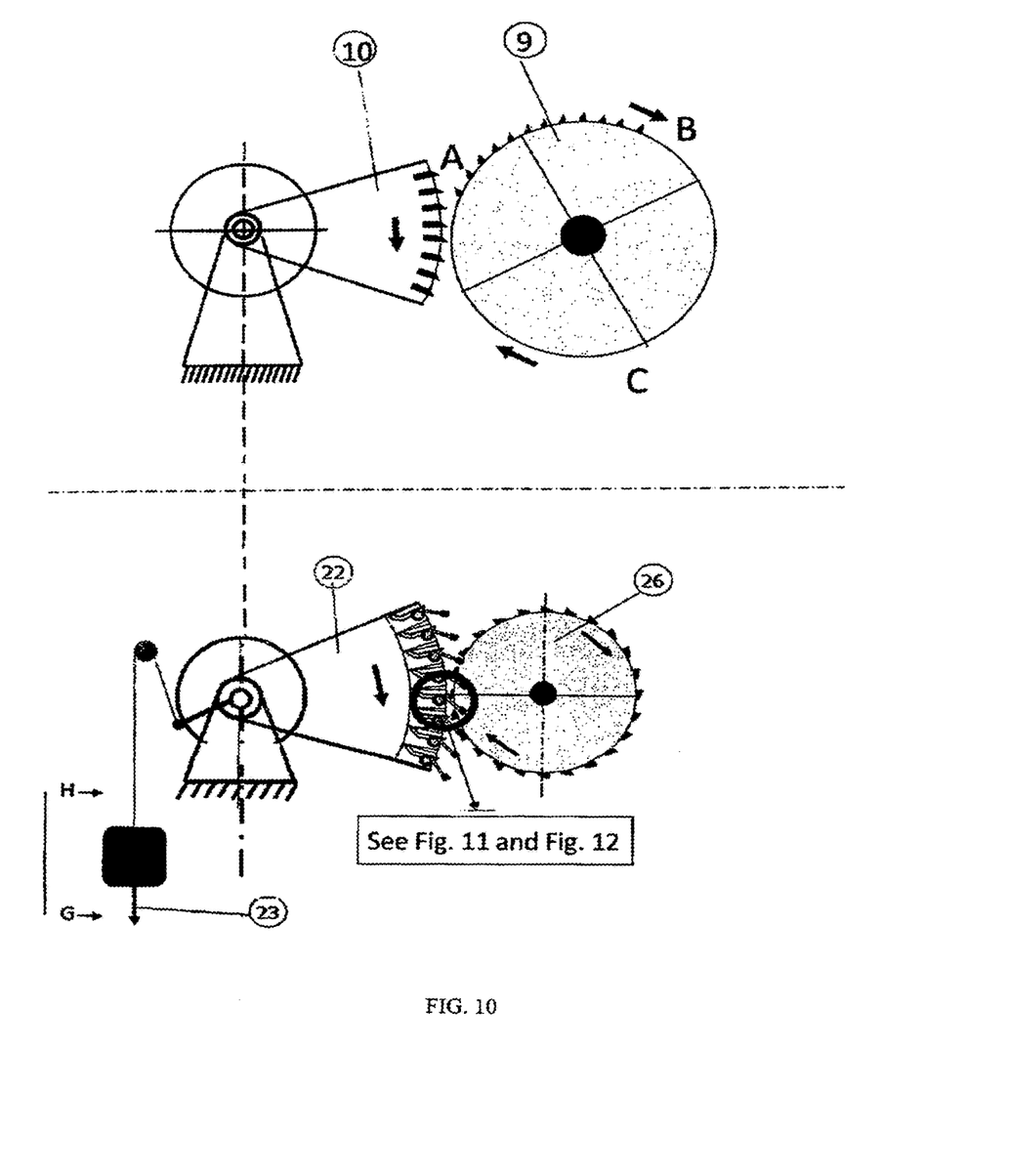
Figure 11:
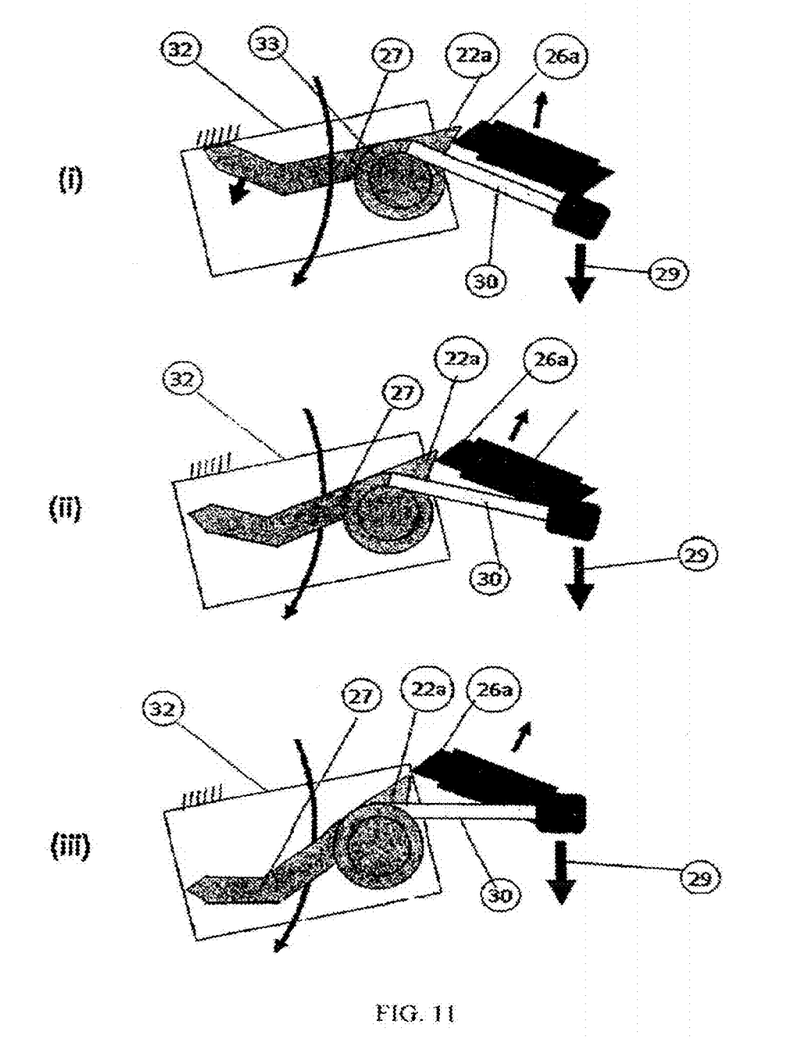
Figure 12:
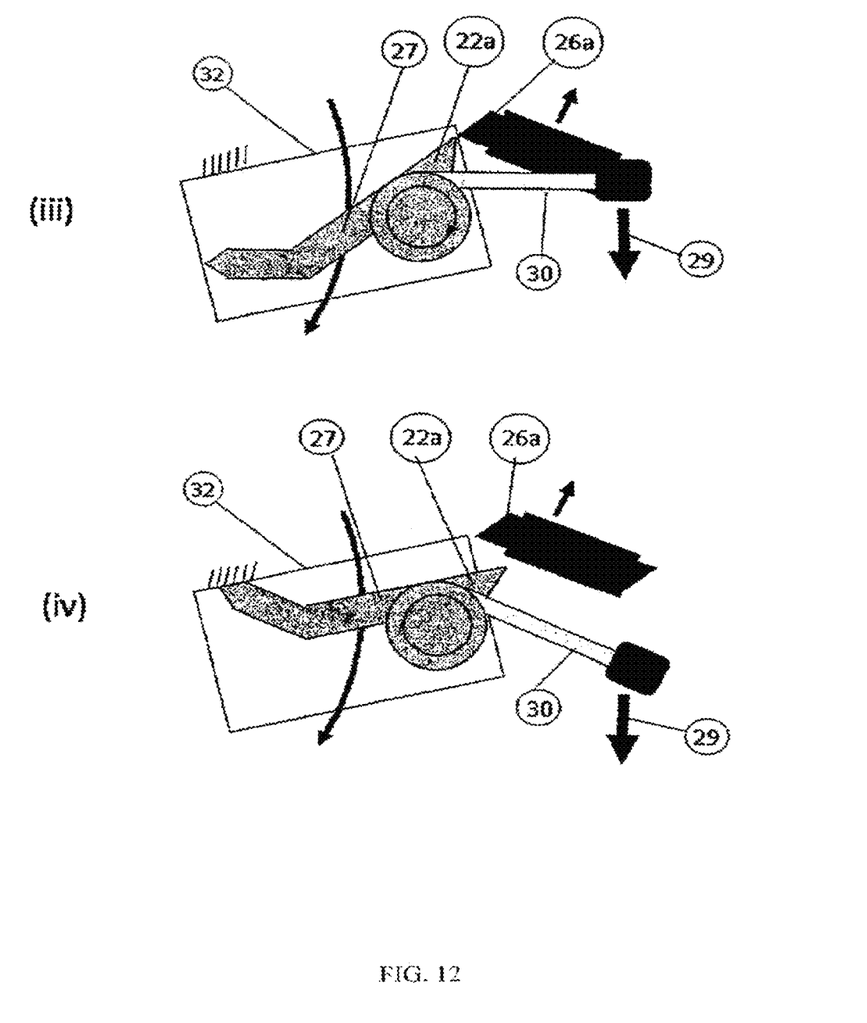

FIG. 10 shows a situation when the Input Lever (10) and the Input Sprocket (9) are disengaged. This disengagement is due to the fact that there are no teeth in the Segment (ACB) of the Input Sprocket (9), which allows the Gravity Force of the Weight A (23) to pull the string down and cause the Output Lever (22) and the Input Lever (10) to rotate clockwise. FIG. 11 and FIG. 12 explain the situation in more detail.

FIG. 11 and FIG. 12 shows what is happening in the contacting and dis-contacting process.

In FIG. 11 (i), as the Tooth Assembly Box (32) moves downward, the pushing between the Tooth (22a) and the Tooth (26a) causes the Tooth Assembly (27) to rotate in counter-clockwise rotation around the Hinge (33).

FIG. 11 (ii) shows a situation when the Tooth Assembly Box (32) rotated almost half way down and the pushing between the Output Sprocket Tooth (26a) and the Output Lever Tooth (22a) continues and let the Tooth Assembly (27) rotate counter-clockwise.

FIG. 11 (iii) shows the moment when the Output Lever Tooth (22a) disengages from the Output Sprocket Tooth (26a).

FIG. 12 (iii) is a copy of FIG. 11(iii).

FIG. 12 (iv) shows that as soon as the disengagement starts, the gravity force of weight B (29) pulls down the Lever (30), and rotates the Tooth Assembly (27) in clockwise rotation and brings it back to the position as it was in the beginning of the Tooth Assembly (27) rotation and lets the Tooth Assembly (27) be ready for the next contact.

Figure 13:
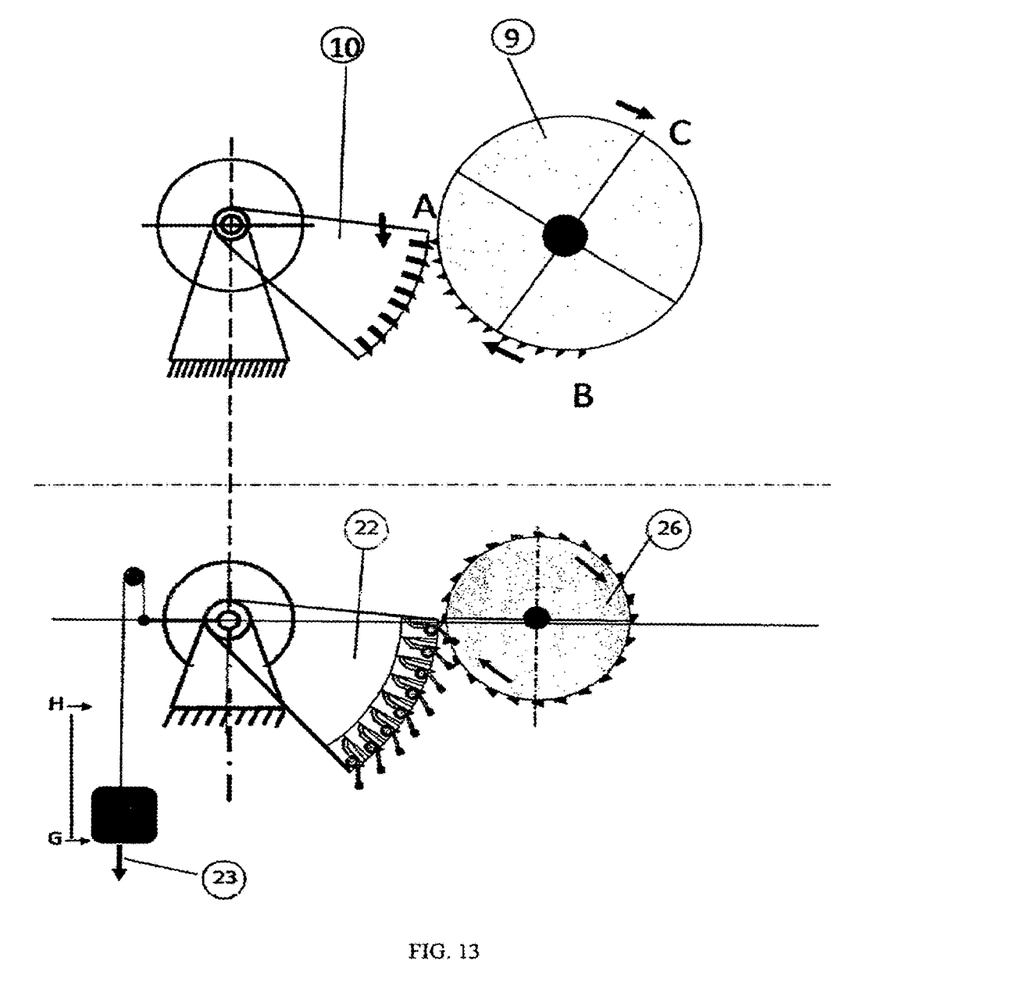

FIG. 13 shows the beginning of the cycle.

Thus, the invented mechanism is able to transfer mechanical rotational energy generated in a Liquid Environment (1) to a Gas Environment (3) but does not allow the liquid to penetrate into the Gas Environment (3).

What is claimed is:

1. A mechanical system for transferring rotational energy from a liquid environment to a gas environment without liquid from the liquid environment penetrating the gas environment, the mechanical system comprising: a first rotational system, the first rotational system located in the liquid environment, the first rotational system comprising: an input sprocket, the input sprocket having a first plurality of teeth covering only part of a circumference of the input sprocket, and an input lever having a second plurality of teeth that engage the first plurality of teeth of the input sprocket; a second rotational system, the second rotational system located in the gas environment, the second rotational system comprising: an output sprocket, the output sprocket having a third plurality of teeth covering a circumference of the output sprocket, an output lever having a fourth plurality of teeth that engage the third plurality of teeth of the output sprocket, a first weight and a second weight; and a metal cylindrical container, the metal cylindrical container comprising: a metal shaft, a plurality of flexible anti-corrosive chemical rubber covers, and a plurality of oil layers contained between the plurality of flexible anti-corrosive chemical rubber covers; wherein the metal shaft of the metal cylindrical container is connected to the input lever of the first rotational system at a first end of the metal shaft, and the metal shaft is connected to the output lever of the second rotational system at a second end of the metal shaft, and the metal shaft transfers rotational energy between the first and second rotational systems; and wherein, the first plurality of teeth covering only part of the circumference of the input sprocket rotate the input lever counter-clockwise when the input sprocket rotates clockwise, and a portion of the circumference of the input sprocket without teeth causes a disengagement of the input lever and input sprocket allowing the first weight to rotate the input lever in the clockwise direction.

* * * * *